J. N. KELMAN.
CUSHION FOR VEHICLES.
APPLICATION FILED NOV. 10, 1920.
1,404,031.
Patented Jan. 17, 1922.
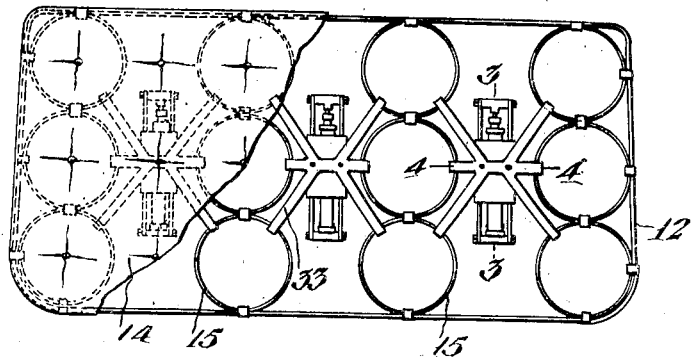
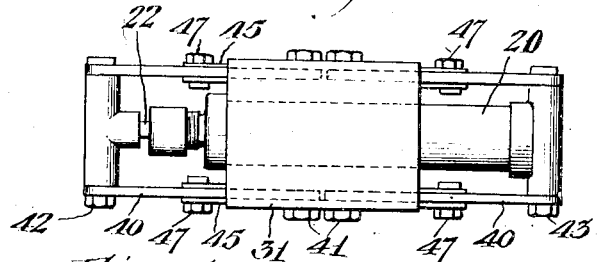
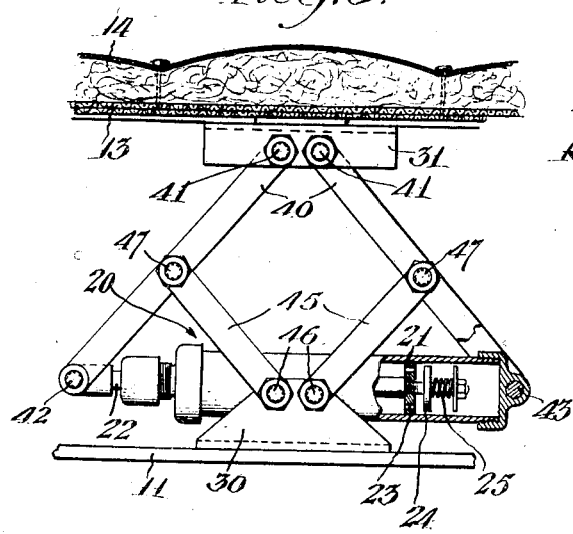
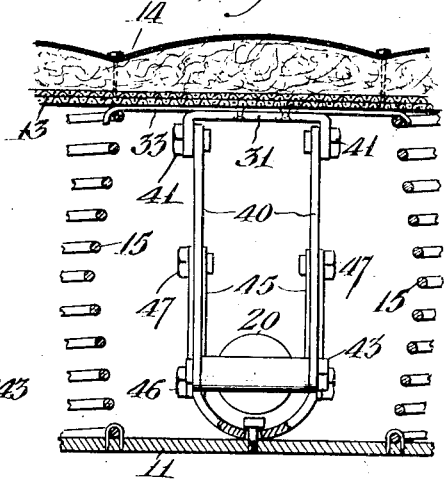
Inventor
Joseph N. Kelman
by Graham & Harris
Attorneys.

UNITED STATES PATENT OFFICE.

JOSEPH N. KELMAN, OF LOS ANGELES, CALIFORNIA.

CUSHION FOR VEHICLES.

1,404,031.　　　　Specification of Letters Patent.　　Patented Jan. 17, 1922.

Application filed November 10, 1920. Serial No. 423,034.

*To all whom it may concern:*

Be it known that I, JOSEPH N. KELMAN, a citizen of the United States, residing at Los Angeles, in the county of Los Angeles and State of California, have invented a new and useful Cushion for Vehicles, of which the following is a specification.

My invention relates to vehicles and the principal object of the invention is to provide a device in combination with the springs in a vehicle cushion by which the rebound of these springs can be greatly minimized.

It is common practice on automobiles, particularly large automobiles, to provide cushions having deep springs for the purpose of eliminating the shock experienced in the operation of the automobile. These springs are quite efficient in minimizing such shocks but they have the disadvantage of giving a very rapid rebound after having been compressed. This rebound is often sufficient to throw the passengers entirely off the seat and, in some cases, to cause them to strike their heads against the top or the supporting structure for the top.

My invention is designed to check this rebound and, therefore, do away with this disagreeable feature which has previously been considered as inseparably connected with the use of such springs.

Further objects and advantages will be made evident hereinafter.

Referring to the drawing which is for illustrative purposes only,

Fig. 1 is a plan view of a cushion partly broken away to show the internal structure.

Fig. 2 is a plan view of one of the retarding mechanisms used by me in the practice of my invention.

Fig. 3 is a section on a plane represented by the line 3—3 of Fig. 1, showing a portion of the structure shown in that figure.

Fig. 4 is a partial section on a plane represented by the line 4—4 of Fig. 1, showing the mechanism illustrated in Fig. 3.

In the form of the invention illustrated, 11 is the rigid base or structure upon which the cushion rests. This cushion consists of a fabric frame 12 and a leather or fabric top 13 which may be padded as shown at 14. Spiral compression springs 15 are provided resting on the base 11 and pressing against the member 13. The weight of the passenger is carried by these springs and in the event that the springs are suddenly compressed, which will occur whenever the vehicle passes over an obstruction, I have found that the rebound of these springs may be very rapid and that they tend to throw the passengers violently upward.

For the purpose of checking this tendency, I use the device shown in the drawing which consists of a dash pot 20 having a plunger 21 sliding freely in gas tight relationship therein. This plunger includes a rod 22. The plunger proper has perforations 23 therein which may be closed by a valve 24 held in place by a spring 25. A base 30 is provided resting on the member 11 and a saddle 31 is provided secured to the member 13 and secured by means of a spider 33 directly on top of some of the springs 15.

Two pairs of arms 40 are pivoted to bolts 41, these arms extending downwardly and one pair being secured at 42 to the rod 22, the other pair being secured at 43 to the dash pot 20. Links 45 are pivoted at 46 to the base 30 and are pivoted at 47 at intermediate points on the arms 40.

The method of the operation of the invention is as follows:

The weight of the passengers rests on the springs 15. Whenever these springs are compressed for any reason, so that the member 13 approaches the member 11, the plunger 21 moves to the left and the dash pot 20 moves to the right, as shown in Fig. 3. This movement takes place without retardation, the valve 24 lifting and allowing the air or oil with which the dash pot is filled to be displaced freely by the plunger 23. In so far, therefore, as the compression of the springs 15 is concerned, the dash pot is practically without any effect and these springs may be compressed readily and quickly.

When, after the compression has been completed and the springs start to expand or extend themselves, the pressure of the springs is transmitted through the member 13 and through the straps 33 to the saddle 31 which is thus forced upwardly. This tends to move the points 42 and 43 towards each other, the plunger 21 sliding toward the right and the dash pot 20 sliding towards the left, as seen in Fig. 3. This mutual movement between the dash pot 21 and the plunger 20 is resisted by the fluid in the dash pot, due to the valve 24 closing the holes 23.

The practical result of this is that while the springs can be compressed readily and quickly thus yielding to the downward movement of the passengers, the dash pot resists the extension of these springs so that the member 13 moves upward slowly, thus preventing the rapid rebound which would otherwise occur.

I claim as my invention:

1. In a cushion for a vehicle the combination of compression springs upon which the weight of a passenger is supported; a dashpot inside said cushion with its axis substantially parallel with said cushion; a plunger moving freely in said dashpot; a saddle connected with the upper end of said springs; a base resting upon a rigid support upon which said cushion is supported; two pairs of long arms each pair pivoted at its upper end on said saddle; means for connecting the lower end of one pair to said dashpot; means connecting the lower end of the other pair to said plunger; and two pairs of links, each pair pivoted at its lower end to said base and at its upper end to an intermediate point on said arms.

2. In a cushion for a vehicle the combination of compression springs upon which the weight of a passenger is supported; a dashpot inside said cushion with its axis substantially parallel with said cushion; a plunger moving freely in said dashpot; a saddle connected with the upper end of said springs; a base resting upon a rigid support upon which said cushion is supported; two pairs of long arms, each pair pivoted at its upper end on said saddle; means for connecting the lower end of one pair to said dashpot; means connecting the lower end of the other pair to said plunger; valve means closing an opening through said plunger when said plunger moves in one direction only; and two pairs of links, each pair pivoted at its lower end to said base and at its upper end to an intermediate point on said arms.

3. In a cushion for a vehicle the combination of compression springs upon which the weight of a passenger is supported; a dashpot inside said cushion with its axis substantially parallel with said cushion; a plunger moving freely in said dashpot; a saddle connected with the upper end of said springs; a base resting upon a rigid support upon which said cushion is supported; two pairs of long arms, each pair pivoted at its upper end on said saddle; means for connecting the lower end of one pair to said dashpot; means connecting the lower end of the other pair to said plunger; valve means closing and opening through said plunger when said plunger moves due to the extension of said springs; and two pairs of links, each pair pivoted at its lower end to said base and at its upper end to an intermediate point on said arms.

In testimony whereof, I have hereunto set my hand at Los Angeles, California, this 4th day of November, 1920.

JOSEPH N. KELMAN.